(12) United States Patent
Penson et al.

(10) Patent No.: US 8,658,231 B2
(45) Date of Patent: Feb. 25, 2014

(54) COFFEE FLAVOUR MODIFICATION PROCESS

(75) Inventors: Simon Peter Penson, Warwick (GB); Scott D. Brooks, Menasha, WI (US); Anthony Wragg, Banbury (GB); David Ikenberry, Glenview, IL (US); Allan Bradbury, Türkenfeld (DE); Kazuto Ozaki, Tokyo (JP); Fumio Ito, Mie (JP)

(73) Assignee: Kraft Foods R&D, Inc., Deerfield, IL (US)

( * ) Notice: Subject to any disclaimer, the term of this patent is extended or adjusted under 35 U.S.C. 154(b) by 618 days.

(21) Appl. No.: 11/771,529

(22) Filed: Jun. 29, 2007
(Under 37 CFR 1.47)

(65) Prior Publication Data

US 2008/0299283 A1 Dec. 4, 2008

(30) Foreign Application Priority Data

Jun. 29, 2006 (EP) .................................. 06116265

(51) Int. Cl.
*A23F 5/02* (2006.01)
*A23F 5/26* (2006.01)

(52) U.S. Cl.
USPC ........... 426/425; 426/427; 426/432; 426/434; 426/595

(58) Field of Classification Search
USPC .......................... 426/425, 427, 432, 434, 595
See application file for complete search history.

(56) References Cited

U.S. PATENT DOCUMENTS

| | | | |
|---|---|---|---|
| 3,985,905 A * | 10/1976 | Scelia et al. | 426/427 |
| 4,031,251 A | 6/1977 | Margolis et al. | |
| 4,160,042 A | 7/1979 | Farr et al. | |
| 4,276,315 A * | 6/1981 | Katz et al. | 426/428 |
| 4,278,696 A | 7/1981 | Magnolato | |
| 4,317,841 A * | 3/1982 | Brambilla et al. | 426/239 |
| 4,872,987 A | 10/1989 | Kopsch et al. | |
| 4,922,812 A | 5/1990 | Schweinfurth | |
| 4,976,983 A | 12/1990 | Hirsh et al. | |
| 5,019,413 A | 5/1991 | Becker et al. | |
| 5,132,134 A | 7/1992 | Nini et al. | |
| 5,147,666 A | 9/1992 | Doonan et al. | |
| 5,147,674 A | 9/1992 | Schweinfurth | |
| 5,208,056 A | 5/1993 | Fischer et al. | |
| 7,220,440 B2 | 5/2007 | Dria et al. | |
| 2004/0191333 A1 * | 9/2004 | Thakur et al. | 424/729 |
| 2004/0208956 A1 * | 10/2004 | Schatzmayr et al. | 426/49 |
| 2005/0181107 A1 * | 8/2005 | Naef et al. | 426/594 |

FOREIGN PATENT DOCUMENTS

| | | |
|---|---|---|
| DE | 1 083 635 B | 6/1960 |
| EP | 0534024 A2 | 3/1993 |
| EP | 1632135 A1 | 3/2006 |

OTHER PUBLICATIONS

Clarke, Ronald James and R. Macrae, Coffee Physiology, vol. 3, Elsevier Applied Science Publishers, LTD., 1988, pp. 275.*
Spiller, Gene A., Caffeine, CRC Press, 1998, pp. Chapter 5 and 6.*
European Patent Office Extended European Search Report for European Application No. 06116265.7 dated Dec. 5, 2006 (5 pages).

* cited by examiner

*Primary Examiner* — Lien T. Tran
*Assistant Examiner* — Hong T Yoo
(74) *Attorney, Agent, or Firm* — Fitch, Even, Tabin & Flannery LLP (57) ABSTRACT

The invention relates to a process for improving the flavor of roasted *Robusta* and *Arabica* quality coffee and is characterized by modifying roasted coffee flavor precursors in aqueous extracts of green coffee beans.

32 Claims, 6 Drawing Sheets

COFFEE FLAVOUR MODIFICATION PROCESS

FIELD OF THE INVENTION

The present invention relates to the flavour improvement of *Robusta* and *Arabica* quality roasted coffee.

BACKGROUND OF THE INVENTION

Coffee occurs predominantly as two species, *Coffea Arabica* (*Arabica* coffee) and *Coffea Robusta* (*Robusta* coffee). Beverages made from the two types have different flavour profiles. *Robusta* coffees are characterised as strong, earthy, bitter and neutral. *Arabica* coffees are characterised as mild, acidic and aromatic.

Green coffee contains a complex mixture of chemicals (principally chlorogenic acid, sugars, caffeine, trigonelline, proteins, amino acids and trace aroma compounds) which, on roasting, develop the flavour, aroma and colour typical of roasted coffee. Chemicals present in green coffee are precursors of roast coffee flavour and aroma.

Most green coffee (i.e. coffee cherries which have been processed to yield dry coffee beans) is processed simply by roasting. This develops the flavours, aromas and colour typical of the product. Prior to roasting, green coffee can be treated to remove caffeine (the so-called decaffeination process). In this process, beans are pre-moisturized and either put directly in contact with supercritical $CO_2$ as a solvent to remove caffeine, or else the water-soluble proportion of the beans is extracted and the green extract is treated with activated charcoal to selectively remove caffeine. The caffeine-lean extract is then reinfused into untreated beans in a counter-current fashion. Such processes are for example described in U.S. Pat. No. 4,922,812, 5,147,674 or 5,208,056. There are other materials known with which caffeine can be removed from green extracts, such as carbon fibres, caffeine imprint polymers, fatty materials, zeolites, organic solvents, solvent systems, resins and others.

In addition to decaffeination, some green coffee is also treated prior to roasting by steaming at elevated temperature. This has the effect of reducing off-flavours in some coffees (notably *Robusta* coffees) and develops acidity. Steaming of green beans has been practiced by several companies for over 10 years, and used as a productivity technology because it enhances the quality of lower cost coffees, allowing substitution for higher cost coffees in blended products. The steaming process is for example described in U.S. Pat. No. 5,019,413. However, utilization of steamed coffee is limited because the process reduces some desirable coffee flavours and aromas (principally roasted notes) and introduces a processed note (indicated, among others, by β-damascenone and furfuryl pyrrole (FFP)).

U.S. Patent Application Publication 2004/0081724 A1 describes a process for producing roasted coffee beans having reduced levels of acrylamide by reducing the level of asparagine in coffee beans comprising the addition of an asparagine-reducing enzyme to coffee beans.

Other U.S. patents describe the reduction or removal of further green coffee bean constituents from green extracts, however, these constituents are not flavour precursors and their reduction or removal is carried out for other reasons.

The removal of chlorogenic acid with resins is described in U.S. Pat. No. 4,031,251, with ligneous adsorbents in U.S. Pat. No. 4,160,042, with gel permeation chromatography on cross-linked modified polysaccharides in U.S. Pat. No. 4,872,987.

The removal of malic acid with ion exchange resins is described in U.S. Pat. Nos. 4,976,983 and 5,132,134 and by malolactic fermentation in U.S. Pat. No. 5,147,666.

The removal of potassium by ion exchange, membrane separation or electrodialysis is described in EP-0 534 024.

U.S. Pat. Nos. 4,278,696 and 4,317,841 describe the treatment of green extracts by deacidifying (increase of pH) with chitosan.

Treatment of roast and ground coffee extract with immobilized PVP or PVPP, in order to limit the aroma degradation of soluble coffee, is disclosed in EP 1 632 135 A1.

It is the object of the present invention to provide a process for modifying the flavour of *Robusta* and *Arabica* quality roasted coffee which overcomes the problems and disadvantages of the green bean steaming process, i.e. which does not reduce desirable coffee flavours and does not introduce a processed note.

SUMMARY OF THE INVENTION

The present invention basically provides a process for improving the flavour of roasted *Robusta* and *Arabica* quality coffee by modifying roasted coffee flavour precursors in aqueous extracts of green coffee beans.

In a preferred embodiment, the process is characterised by the following steps:
a) putting dry or pre-moisturised green *Robusta* or *Arabica* coffee beans into contact with water or treated extract to extract water-soluble flavour precursors in an amount of about 4 to about 40% by weight of soluble solids;
b) treating the obtained extract with heat, either directly or indirectly, to reduce the pH of the
   b1) *Robusta* extract by about 0.2 to about 1.0 pH units, preferably about 0.4 to about 0.9 pH units, most preferably by about 0.5 to about 0.8 pH units, at a temperature of about 170° to about 250° C., preferably about 190° to about 230° C., most preferably about 200° to about 210° C., for about 10 to 360 sec., preferably about 30 to about 240 sec. and most preferably about 90 to about 120 sec.
   b2) *Arabica* extract by about 0.5 to about 2.0 pH units, preferably about 1.0 to about 2.0 pH units, most preferably by about 1.5 to about 2.0 pH units, at a temperature of about 170° to about 250° C., preferably about 190° to about 230° C., most preferably about 200° to about 215° C., for about 10 to about 360 sec., preferably about 30 to about 240 sec. and most preferably about 40 to about 60 sec.
   b3) *Arabica* extract by about 0.5 to about 2.0 pH units preferably by about 1.0 to about 2.0 pH units, most preferably about 1.5 to about 2.0 pH units at a temperature of about 50° to about 90° C. for about 2 to about 60 hours;
c) combining the obtained extract or the soluble solids of the treated extract with the extracted green coffee beans and drying the beans if the green coffee beans have been extracted with water, or
   drying the beans if the green coffee beans have been extracted with treated extract.

This process may be characterised by an additional step, wherein sugars and chlorogenic acid are isolated from the extract obtained in step a) by an ultrafiltration treatment and the isolated components are heat-treated according to step b) and then returned to the main extract.

If the beans are pre-moisturised, a moisture content of about 50 to about 60% by weight is preferred.

In a further preferred embodiment, the process comprises the following steps:

a) putting dry or pre-moistured green *Robusta* coffee beans into contact with water or treated extract to extract water-soluble flavour precursors in an amount of about 4 to about 40% by weight of soluble solids;
b) treating the extract with about 2 to about 5% by weight of a hydrophobic resin or cation exchange resin at a temperature of about 5° to about 60° C. for about 5 to about 30 min. to reduce the content of coumaryltryptophan or caffeoyltryptophan;
c) combining the extract or the soluble solids of the treated extract with the extracted green coffee beans and drying the beans if the green coffee beans have been extracted with water, or
drying the beans if the green coffee beans have been extracted with treated extract.

Polyvinylpyrrolidone (PVP) is preferably used as the resin.

Process step b) is preferably repeated 2 to 5 times and the coumaryltryptophan and caffeoyltryptophan content of the resulting green coffee beans is preferably reduced by at least about 50% by weight, more preferably at least about 80% by weight and most preferably by at least about 90% by weight or more.

In another preferred embodiment the process comprises the following steps:

a) putting dry or pre-moistured green *Robusta* coffee beans into contact with water or treated extract to extract water-soluble flavour precursors in an amount of about 4 to about 40% by weight of soluble solids;
b) treating the extract with a microorganism for about 12 to about 120 hours to reduce caffoylquinic acid and feruloylquinic acid;
c) combining the extract or the soluble solids of the treated extract with the extracted green coffee beans and drying the beans if the green coffee beans have been extracted with water, or
drying the beans if the green coffee beans have been extracted with treated extract.

After process step b) the sucrose content and/or the pH are preferably adjusted to their original levels. This may be achieved by adding sucrose to the fermented extract to bring it back to the original level, and then adjusting the pH back to the starting pH using malic acid.

*Rhodotorula mucilaginosa* is preferably used as microorganism.

The caffoylquinic acid content and the feruloylquinic acid content are preferably each reduced by at least 95% by weight.

The present invention is also directed to *Robusta* or *Arabica* quality coffee beans having improved coffee flavor, the coffee beans being prepared by a method comprising:

(1) extracting dry or pre-moistened *Robusta* or *Arabica* quality green coffee beans with an aqueous solution to obtain (i) an aqueous extract containing water-soluble flavor precursors at about 4 to about 40 weight percent soluble solids, and (ii) extracted coffee beans;
(2) separating the aqueous extract and the extracted coffee beans;
(3) treating the separated aqueous extract to modify the water-soluble flavor precursors to obtain modified water-soluble flavor precursors, wherein the modified water-soluble flavor precursors are contained in the treated separated aqueous extract or are soluble solids obtained from the treated separated aqueous extract;
(4) combining the modified water-soluble flavor precursors with the separated extracted coffee beans to provide flavor-enhanced coffee beans; and
(5) drying the flavor-enhanced coffee beans to obtain the *Robusta* or *Arabica* quality coffee beans having improved coffee flavor.

*Robusta* green quality coffee beans having improved coffee flavor of step (5) have a reduced coumaryltryptophan content of less than about 0.05 g/kg roasted coffee beans, preferably less than about 0.01 g/kg green coffee beans, and a reduced caffeoyltryptophan content of less then about 1.0 g/kg roasted coffee beans, preferably less than about 0.5 g/kg green coffee beans.

*Robusta* roasted quality coffee beans having improved coffee flavor of step (5) have a reduced coumaryltryptophan content of less than about 0.05 g/kg roasted coffee beans, preferably less than about 0.01 g/kg roasted coffee beans, and a reduced caffeoyltryptophan content of less then about 1.0 g/kg roasted coffee beans, preferably less than about 0.5 g/kg roasted coffee beans, and a reduced 3-methylindol content of less than about 1.0 mg/kg roasted coffee beans, preferably less than about 0.5 mg/kg roasted coffee beans.

DETAILED DESCRIPTION OF THE INVENTION

The present invention relates to a process for improving the flavour of roasted *Robusta* and *Arabica* quality coffee by modifying roasted coffee flavour precursors in aqueous extracts of green coffee beans.

Surprisingly, modifying the aroma or flavour precursors in aqueous extracts of green coffee beans, for example by simply heat-treating the extracts or by any other useful treatment, unwanted flavours can be reduced without reducing desired coffee flavours and without introducing a processed note as in the case of steaming.

Figure 1:
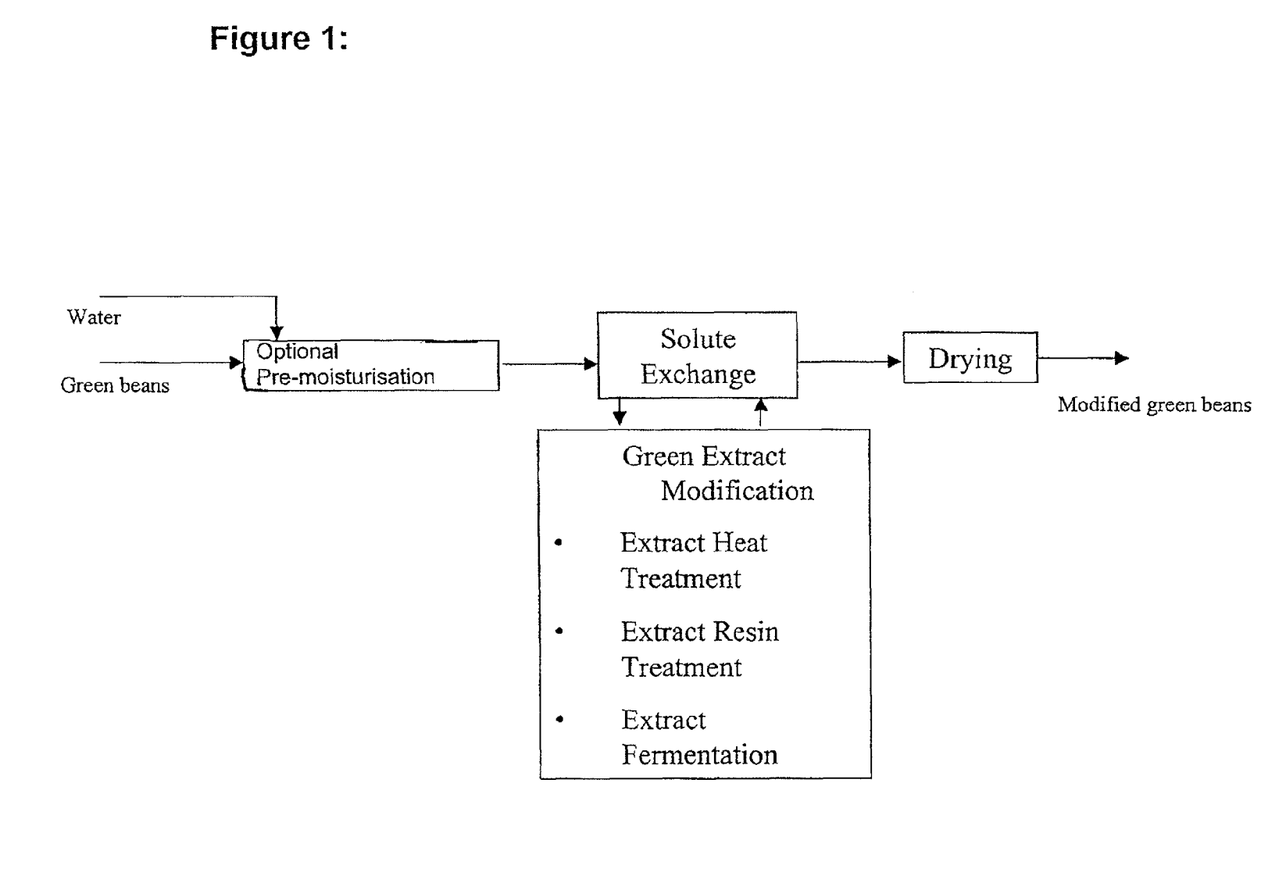
FIG. 1 is a flow diagram of the green extract modification process according to the invention.

Even if it was known to eliminate or reduce unwanted coffee constituents from green bean extracts, such as caffeine, malic acid or chlorogenic acid, which are not affected by the roasting step and occur unchanged in aqueous roasted coffee extracts, no one has ever tried to modify flavour precursors in aqueous green coffee bean extracts. Green extract modification is a novel technology for manipulating the flavour of green coffee prior to roasting. The process is based on moistening green coffee beans to a moisture content of about 50 to about 60% by weight prior to entering the extraction phase. The beans are then put into contact with water in a batch process or in a continuous process with water (during start-up) and treated extract (during normal operation) to extract water-soluble flavour precursors. The extract thus generated is then treated (modified) physically, chemically or biochemically to selectively modify the extracts in order to transform or remove undesirable flavour precursors or enhance desirable flavour precursors. A flow diagram including the main process steps of the green extract modification process is shown in FIG. 1. The technologies of extract heat treatment, extract resin treatment and extract fermentation address different degrees of extract modification (and hence flavour modification) and can be used separately or together.

In an optional first process step, green coffee beans, whether *Robusta* or *Arabica* coffee beans, are pre-moistured to a moisture content of about 50 to about 60% by weight. For this purpose, the beans are soaked in water for a sufficient time. Usually, a soaking time of about 45 min at a water temperature of between about 60° and about 80° C. is sufficient.

The dry or pre-moistured beans are put into contact with water or, in a continuous process, first with water (during start-up) and then with already-treated extract (during normal operation) to extract water-soluble flavour precursors in an amount of about 4 to about 40%, preferably about 10 to about 30% and most preferably about 18 to about 21% by weight of soluble solids. An extraction time of about 2 to 4 hours within a temperature range of about 60° to 100° C. is normally sufficient.

The extraction and subsequent treatment of the extract can be effected in a simple batch vessel or, if the process is a continuous process, in a so-called carousel extractor, as described for example in U.S. Pat. No. 4,922,812, or in a pulsed column reactor.

The extraction of the moistured coffee beans can be effected with water or, in a continuous process, with already-treated extract after the start-up phase. The use of an already-treated extract as the extraction means has the advantage, that the process solution is in equilibrium with the raw coffee constituents in the beans, except the constituents which have been modified by the treatment. Therefore, it is possible to remove only the constituents which undergo a modification during the treatment whereas as all other raw coffee constituents remain in the beans. Furthermore, the coffee beans are enriched with the modified constituents after the treatment which may positively influence the flavour and aroma of the latter on roasted coffee beans.

The obtained extract is treated in the next step physically, chemically or biochemically to transform or remove undesirable flavour precursor or else enhance desirable flavour precursors.

Green Extract Heat Treatment

*Robusta* and lower-grade *Arabica* coffees have lower levels of titratable acidity in both the green and roasted beans than higher-cost *Arabica* coffees. This influences roasting chemistry and favours the production of bitter roasted notes typical of *Robusta* and lower-grade *Arabica* coffees. In addition, sourness/acidity is considered a desirable flavour attribute. Steaming increases the acidity of green coffee and also reduces some of the undesirable *Robusta* aroma notes. However, steaming also introduces the above-mentioned so-called processed note, typically described as pruney and stewed aromas and pruney and tea-like flavour, and reduces overall roast coffee character. This limits the substitution potential of steamed coffee as the processed note is considered undesirable and differentiates the product. A surprising aspect of the present invention is that the extract heat treatment according to the present invention does not introduce the pruney processed note associated with steamed coffee. Specifically, it does not produce β-damascenone, a key indicator of the processed note. A further surprising aspect of the present invention is that the heat treatment results in a balanced and well-developed roast coffee character. These findings show that the heat treatment of aqueous green coffee bean extracts according to the present invention is a novel route to upgrade the quality of *Robusta* and *Arabica* beans.

The main process variables are treatment time and temperature. Saturated green coffee extract is heat-treated using, for example, an electronic heater or direct steam injection. A plugged-flow reactor would also be suitable. The objective is to raise the temperature of the extract from the holding temperature (typically 80° C.) to the target temperature in less than 1 min. The extract is then held at this temperature for about 10 to about 360 sec. The effect of this treatment is to hydrolyse sugars (sucrose, glucose and fructose) and chlorogenic acid in the green extract. These compounds are hydrolysed to generate organic acids (acetic, formic, lactic, glycolic and quinic acids). The effect of this is to reduce the pH of the green extract.

The heat treatment of *Robusta* extracts is effected at a temperature of about 170° to about 250° C., preferably about 190° to about 230° C. and most preferably about 200° to about 210° C. for about 10 to about 360 sec., preferably about 30 to about 240 sec., and most preferably about 90 to about 120 sec. in order to reduce the pH of the extract by about 0.2 to about 1.0 pH units, preferably about 0.4 to about 0.9 pH units and most preferably by about 0.5 to about 0.8 pH units.

Figure 2:
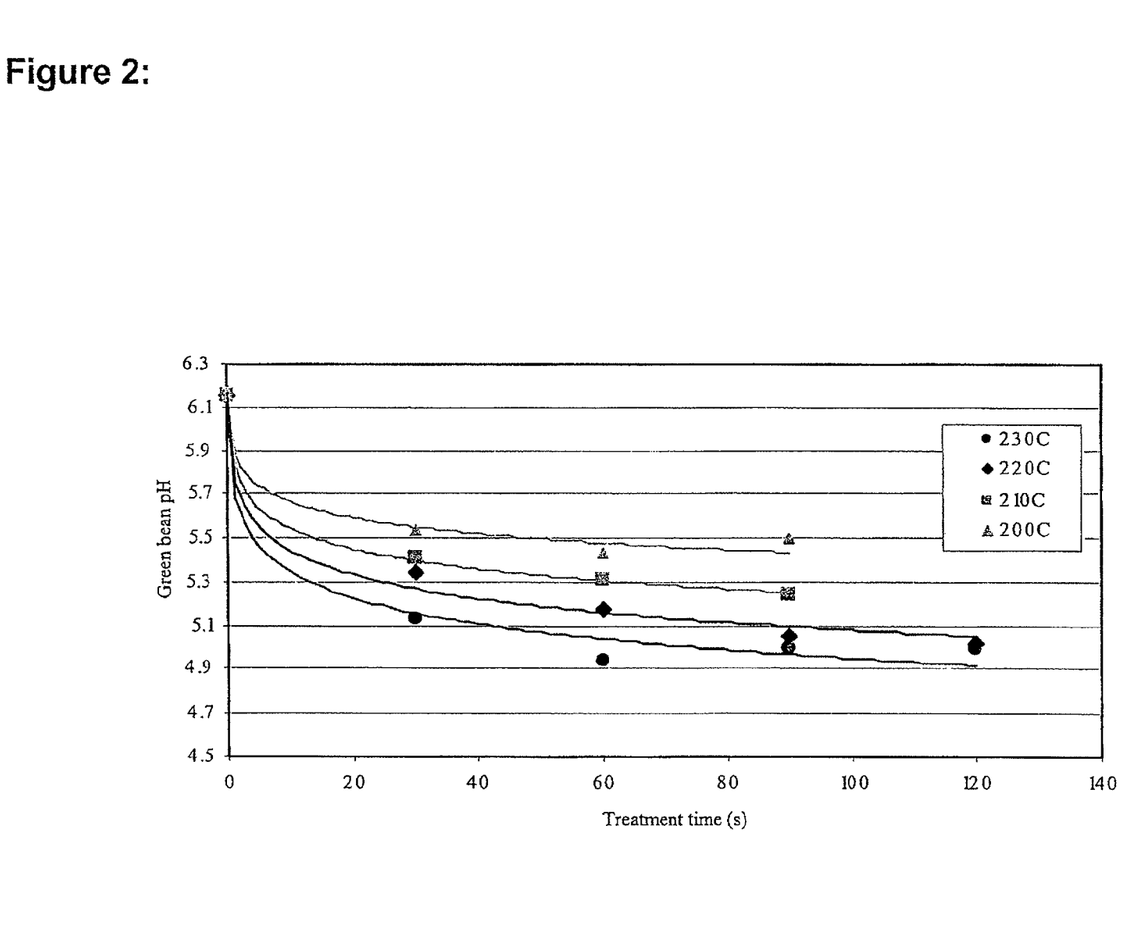
FIG. 2 is a diagram showing the dependency of green bean pH reduction and flavour upgrade by temperature and time for *Robusta* quality coffee.

FIG. 2 shows the dependency of *Robusta* green bean pH reduction and flavour upgrade on temperature and time. A maximum flavour upgrade is achieved at temperatures between 220 and 230° C. or about 90 to 120 sec.

To improve the quality of *Robusta* coffee (typically, but not limited to, Indonesian or Vietnamese grades), the extract is treated ideally at 230° C. for 90 sec. The effect of this is to reduce the pH of green beans after solute exchange by up to 1.0 pH units (FIG. 2). This modifies roasting reactions to reduce the formation of guiacols and pyrazines, which are associated with the bitter and harsh flavour of *Robusta* coffee. There is no increase in β-damascenone, an aroma compound associated with the processed note formed in steamed coffee. The sensory result of this treatment is a *Robusta* coffee with less earthy, harsh and bitter flavour and with increased sourness when compared to untreated *Robusta*. When dark roasted, the coffees are much less bitter and rubbery than untreated *Robustas*. Compared to steamed *Robusta*, heat-treated *Robusta* has little or no detectable processed note and more roasted coffee character. *Robusta* coffees processed using the heat treatment process according to the present invention have lower levels of guiacols than steamed coffees, higher levels of pyrazines than steamed coffees (but less than untreated coffees), and no increase in β-damascenone versus untreated coffees.

The extract obtained from *Arabica* green beans is treated at the same temperature as above, preferably at between 200° to 215° C., for the same time as above, preferably for about 40 to 60 sec., in order to reduce the pH by about 0.5 to about 2.0 pH units, preferably about 1.0 to about 2.0 pH units and most preferably by about 1.5 to about 2.0 pH units.

Figure 3:
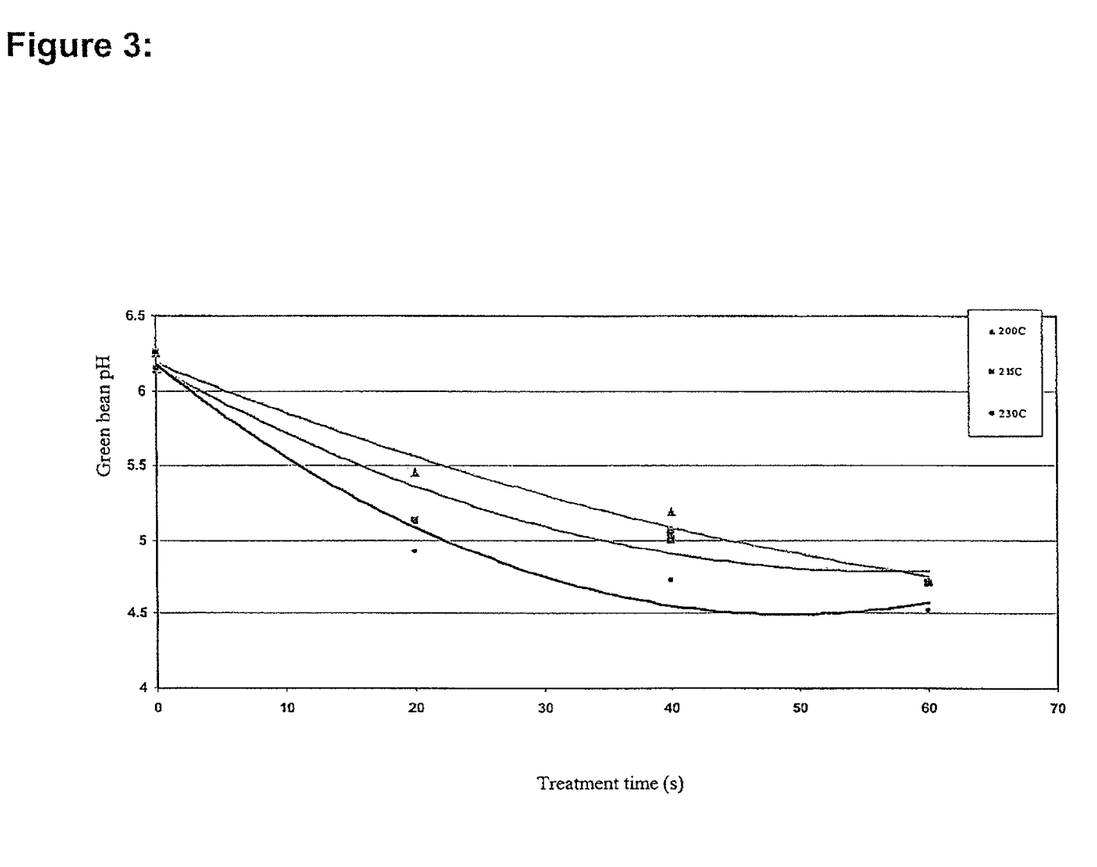
FIG. 3 is a diagram showing the dependency of green bean pH reduction and flavour upgrade by temperature and time for *Arabica* quality coffee.

FIG. 3 describes the dependency of green bean pH reduction and flavour upgrade by temperature and time for *Arabica* green beans. The optimum flavour upgrade is achieved at between about 200° and 215° C. for about 40 to 60 sec.

To improve the quality and develop new flavour profiles in *Arabica* coffee (typically, but not limited to, Brazilian and Colombian coffees), lower treatment temperatures and shorter holding times are used. Typically, 215° C. and 30 to 60 sec. are sufficient to achieve maximum pH drop in the green beans of between 1 and 1.5 pH units (FIG. 3). Again, this results in the hydrolysis of sugars and chlorogenic acid to yield organic acids. The resulting treated coffees when roasted have greatly enhanced acidity (both Brazilian and Colombian) and, in the case of Brazilian coffee, have reduced earth, medicinal and musty flavour profiles.

The aqueous extract heat treatment process according to the present invention exposes Robusta and lower-grade Arabica coffees to high temperature (in excess of 170° C.) for a short time (less than 6 minutes) as a means of increasing acidity in the coffee. This is in contrast to steaming where moistured green coffee is heated under pressure at 120° to 150° C. for up to 70 min.

The heat treatment process increases the titratable acidity in green Robusta and Arabica coffee and reduces the musty aroma notes associated with Robusta and low-grade Arabica coffees. It is surprising that this process does not introduce the processed note associated with steamed coffee and retains roast coffee character.

An alternative route to treat Arabica extract comprises heat-treating the extract at a temperature of about 50° to about 90° C. for about 2 to about 60 hours in order to reduce the pH by about 0.5 to about 2.0 pH units, preferably about 1.0 to about 2.0 pH units and most preferably by about 1.5 to about 2.0 pH units. The low temperature/long-time treatment of Arabica green beans also increases the fruity/floral flavour attributes. Again, this treatment does not introduce the pruney processed note associated with steamed coffee and does not lead to a loss of valuable aroma precursors.

In a preferred embodiment of the treatment process, the sugars and chlorogenic acid which are present in the green coffee extract can first be isolated by an ultrafiltration process. The isolated components are then heat-treated and added back to the main extract. The effect of this is to avoid generation of unwanted process flavours which may result from heat treatment of the whole green extract. It also avoids precipitation of soluble solids, an undesirable side effect of heat treatment which reduces process yield.

If the green coffee beans have been extracted with water, the obtained treated extract or the soluble solids of the treated extract are then re-infused into or combined with the extracted green coffee beans, and, in a last step, the beans are dried at usual temperatures for a sufficient time.

If the green coffee beans have been treated with already-treated extract, the beans are simply dried.

Green Extract Resin Treatment

Two compounds, coumaryltryptophan and caffeoyltryptophan, were identified within the present invention to be major precursors for 3-menthylindol or skatol, a potent aroma compound associated with the earthy, musty note of Robusta coffee. The amount of these compounds can be reduced with a hydrophobic resin or cationic exchange resin and this treatment forms a further preferred embodiment of the present invention.

Green Robusta coffee beans are optionally pre-moistured in a first step to a moisture content of about 50 to about 60% by weight. The dry beans or the optionally pre-moistured beans are put into contact with water or treated extract to extract water-soluble flavour precursors in an amount of about 4 to about 40% by weight soluble solids.

The obtained extract is then treated with about 2 to about 5% by weight of a hydrophobic resin or cationic exchange resin, preferably polyvinylpyrrolidone, at a temperature of about 5° to about 60° C. for about 5 to about 30 minutes to reduce the content of coumaryltryptophan or caffeoyltryptophan. This treatment of the extract is preferably repeated 2 to 5 times. The coumaryltryptophan and caffeoyltryptophan content of the so-treated green coffee beans is reduced by at least about 50 weight percent, preferably by at least about 80% by weight and most preferably by at least about 90% by weight or more.

As above, the extraction can be carried out either with water or with already-treated extract. By using treated extract, only coumaryltryptophan or caffeoyltryptophan are extracted from the beans.

The main process variables for this resin treatment process are % polyvinylpyrrolidone (PVP) used in the treatment, number of PVP treatments, treatment time and temperature. The effect of the process parameters were tested over the following ranges: 0.5 to 5% by weight PVP, 1 to 3 treatments, 5° to 80° C. and 5 to 30 min. Optimum conditions (lowest PVP use, fewest treatments, most practical temperature and time) to achieve a 70% reduction of coumaryltryptophan and caffeoyltryptophan in green extracts were identified as 3% by weight PVP with two treatments. Treatment time and temperature are not significant factors and would be selected to be the most practical for the overall process.

Figure 4:
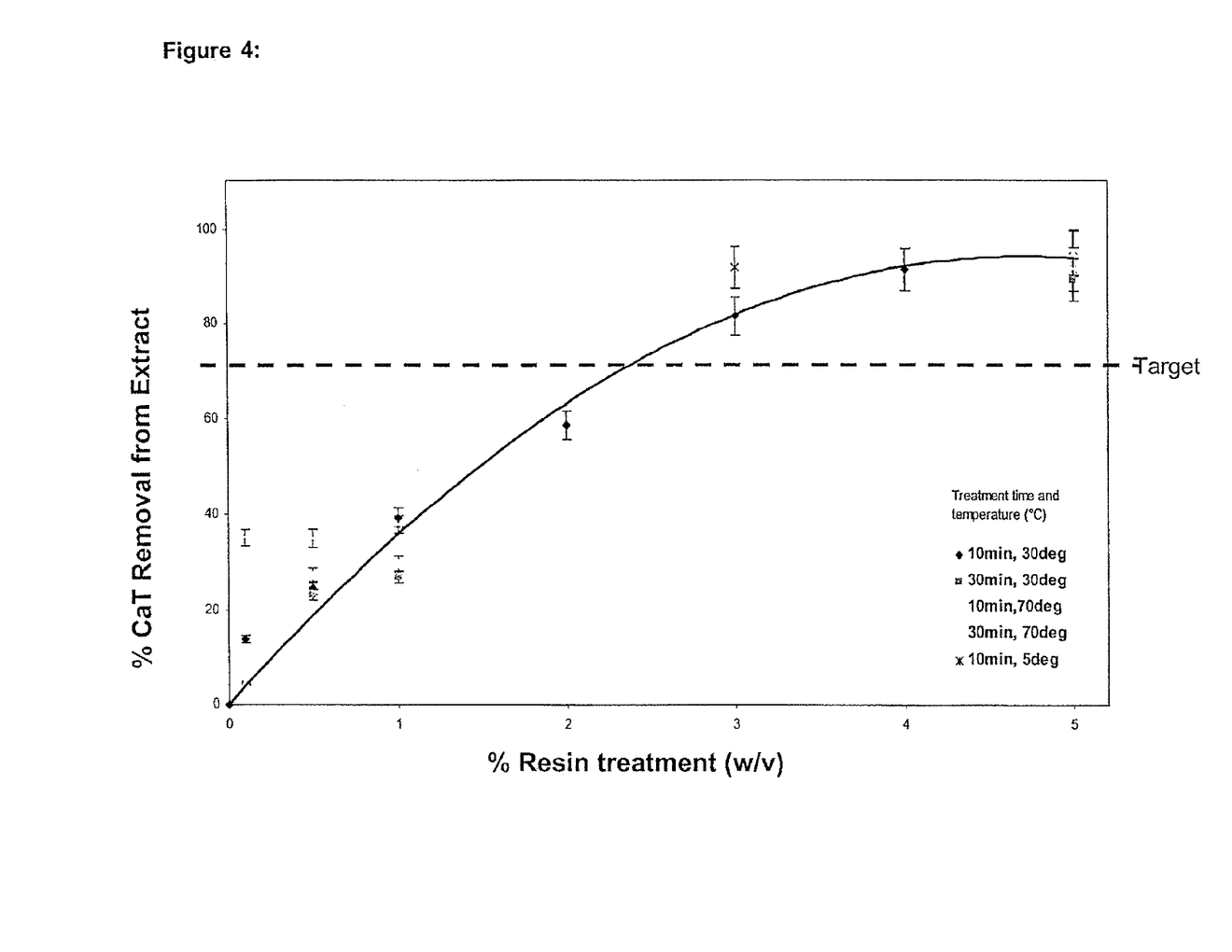
FIG. 4 is a diagram showing the effect of PVP concentration, treatment time and treatment temperature on removal of caffeoyltryptophan (CaT) from *Robusta* green coffee extract.
Figure 5:
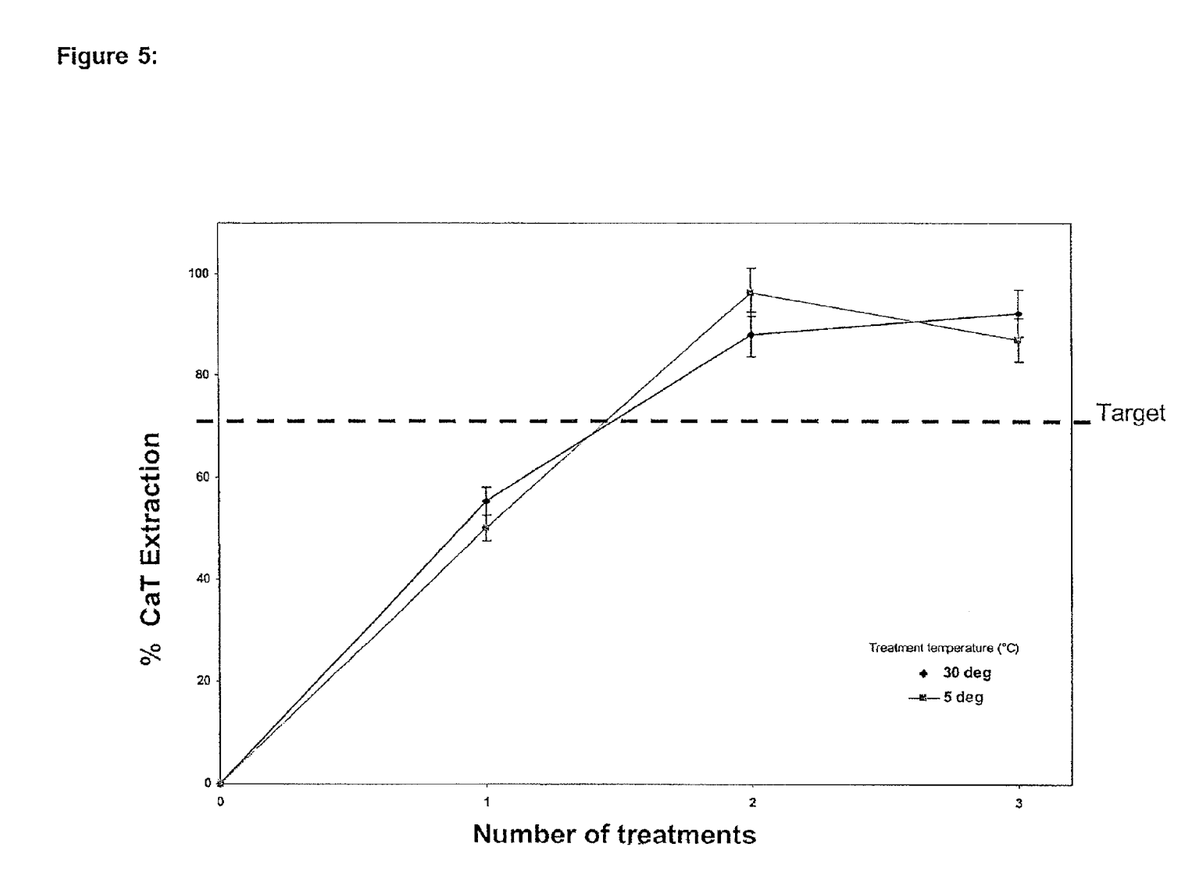
FIG. 5 is a diagram showing the effect of the number of PVP treatments and treatment temperatures on removal of caffeoyltryptophan (CaT) from *Robusta* green coffee extract.

It was found that a 70% reduction in coumaryltryptophan and caffeoyltryptophan in the treated extract leads on roasting to a 3-methylindol content which is reduced by 80%. FIG. 4 shows the effect of PVP concentration, treatment time and treatment temperature on removal of caffeoyltryptophan from Robusta green coffee extract. FIG. 5 shows the effect of the number of PVP treatments and treatment temperature on the removal of caffeoyltryptophan from Robusta green coffee extract.

If the green coffee beans have been extracted with water, the obtained treated extract or the soluble solids of the treated extract are then re-infused into or combined with the extracted green coffee beans, and, in a last step, the beans are dried at usual temperatures for a sufficient time.

If the green coffee beans have been treated with already-treated extract, the beans are simply dried.

Green Extract Fermentation feruloylquinic acid and caffoylquinic acid were identified within the present invention as major precursors of guiacol formation in Robusta coffees. Guiacols are roasted flavour compounds, an excess of which are considered undesirable in roasted coffee aromas. Further, it was found that it is possible to treat green coffee extracts with microorganisms for about 12 to about 120 hours to reduce feruloylquinic acid and caffoylquinic acid.

The process includes—as the processes above—optionally pre-moistening green Robusta coffee beans to a moisture content of about 50 to about 60% by weight. The dry beans or the optionally pre-moistured beans are put into contact with water or treated extract to extract water-soluble flavour precursors in an amount of about 4 to about 40% by weight soluble solids.

The obtained extract is then treated with a microorganism for about 12 to about 120 hours to reduce the contents of feruloylquinic acid and caffoylquinic acid.

Finally, the extracted green coffee beans are then combined with the extract or the soluble solids of the extract if the green bean coffee beans have been extracted with water and they are then dried in a last step. If the green beans have been extracted with already-treated extract, the beans are simply dried.

As mentioned above, the extraction of the green coffee beans with already-treated extracts leads to an extraction of only such compounds from the green beans which are not found in the treated extracted.

A preferred microorganism which can ferment green coffee extract is Rhodotorula mucilaginosa. The microorganism consumes sucrose, caffoylquinic acid, feruloylquinic acid and other phenolic compounds. It also raises the pH of the extract to around 7.0. By adding the sucrose back to pre-fermentation level and preferably adjusting the pH of the extract to about 5.5 and then re-infusing the mixture back into green coffee, the resulting product is a *Robusta* coffee with reduced bitterness and reduced earthy musty notes.

Useful microorganisms are, for example, yeasts and moulds, such as *Aspergillus, Aspergillus japonicus, Penicillium, Penicillium rubrum, Rhodotorula, Rhodotorula rubra, Rhodotorula mucilaginosa* (ATCC number: PTA-7574. Source: decaying vegetation/soil (Glenview, Ill., USA). Media to cultivate: YM (yeast malt extract) agar or broth, incubate at 24° C. Description: lengthened ovoid yeast, multilateral budding; pink to orange-red colonies), *Rhodotorula Ferulica, Rhodotorula Glutinis, Rhodotorula aurantiaca, Rhodosporidium fluviale, Saccharomyces,* and *Saccharomyces cerevisiae,* and bacteria, such as *Arthrobacter, Arthrobacter globiformis, Arthrobacter protophormiae, Brevibacterium, Brevibacterium linens, Micrococcus, Leuconostoc.* Generally, different strains of the individual microorganisms can be used to achieve the results of the present invention. As non limiting examples, the following microorganisms can be used: *Aspergillus japonicus* (ATCC number 20236), *Penicillium rubrum* (ATCC number 46581), *Rhodotorula Ferulica* (ATCC number 76737), *Rhodotorula Glutinis* (ATCC numbers 90781 and 28052), *Rhodotorula aurantiaca* (ATCC number 90775), and *Brevibacterium linens* (ATCC number 9174 and 9175).

It is possible with this process according to the invention to reduce the caffoylquinic acid content and the feruloylquinic content by at least about 95% by weight each.

The invention will now be illustrated by examples which describe preferred embodiments of the present invention. They are not intended to limit the scope of the invention.

EXAMPLES

Example 1

Green Extract Heat Treatment of *Robusta* Coffee

For flavour modification of *Robusta* coffee, saturated green extract is treated at between 190° and 230° C. for between 30 and 120 sec. FIG. 2 shows the effect of heat treatment on green bean pH. In this example, 10 l of saturated green coffee extract were placed in a 40 l jacketed pressure vessel. The pressure vessel was sealed and the contents were heated to various temperatures by direct injection of extra high pressure steam at 32 bar pressure. The temperature of the extract was controlled by varying the pressure in the vessel. The extract was held at the desired temperature for between 30 and 120 sec. and then re-infused to the extracted green coffee beans.

The pH of the green coffee is reduced by between 0.5 and 1.1 units. This reduction in green bean pH is driven by the hydrolysis of sugars (sucrose, glucose and fructose) and chlorogenic acids to yield small aliphatic organic acids, most notably lactic and acetic acid. The effect of reducing green bean pH is to modify aroma formation during roasting. As well as having a higher titratable acidity (TA) content, modified beans also have lower guiacol and pyrazine content than untreated *Robusta* coffees. Coffee produced from the modified beans was described as significantly more sour and less bitter and harsh when compared to a brew produced from a native coffee or a process control. The degree of flavour modification was proportional to the degree of heat treatment, so that a coffee treated at 190° C. for 30 sec. was less flavour modified than a coffee treated at 230° C. for 120 sec. (optimum flavour modification). Treatment at this temperature for longer than 120 sec. results in the generation of undesirable flavour notes ("charred"; "burnt") and also the generation of solid precipitates.

Heat treatment results in green (i.e. unroasted) *Robusta* beans having a reduced pH compared to untreated beans (typically reduced from pH 5.9 to 6.2 in untreated coffee to pH 4.8 to 5.2). The green beans have reduced sucrose content (reduced from 2.7 g/100 g to 1.8 g/100 g). The beans also have an increased total acid content (from 0.10 mmol/kg to 0.26 mmol/kg).

Roasting the treated coffee results in a product in which the guiacol content of the coffee is reduced by around 50% (indicated by vinyl-guiacol; 307.5 mg/kg to 153.4 mg/kg) and pyrazines are reduced by around 46% (indicated by ethyl-pyrazine; 21.6 mg/kg to 11.6 mg/kg), and also a slightly lower $\beta$-damascenone than untreated coffee (0.7 vs. 0.8 mg/kg for treated and untreated coffees, respectively).

In contrast, treated *Robusta* coffees produced by the steaming process have smaller reductions in guiacols and pyrazines (10% and 18% respectively) and show a 56% increase in $\beta$-damascenone (an indicator of processed off-flavour). Therefore, coffee produced using the extract heat treatment process is distinct from steamed coffee.

Example 2

Green Extract Heat Treatment of *Arabica* (Brazil or Colombian) Coffee

For flavour modification of *Arabica* coffee, saturated green extract is treated at between 190° and 220° C. for between 30 and 120 sec., and as described in the example above. FIG. 3 shows the effect of heat treatment on green bean pH. In this example, 10 l of saturated green coffee extract were placed in a 40 l jacketed pressure vessel. The pressure vessel was sealed and the contents were heated to various temperatures by direct injection of extra high pressure steam at 32 bar pressure. The temperature of the extract was controlled by varying the pressure in the vessel. The extract was held at the desired temperature for between 30 and 120 sec. and then re-infused to the extracted green coffee beans.

The pH of the green coffee is reduced by between 0.5 and 1.4 units. This reduction in green bean pH is driven by the hydrolysis of sugars (sucrose, glucose and fructose) and chlorogenic acids to yield small aliphatic organic acids, most notably lactic and acetic acid. The effect of reducing green bean pH is to modify aroma formation during roasting. As well as having a higher titratable acidity (TA) content, modified beans also have lower guiacol and pyrazine content than untreated *Robusta* coffees. Coffee produced from the modified beans was described as significantly more sour and more roasted when compared to a brew produced from a native coffee or a process control. The degree of flavour modification was proportional to the degree of heat treatment, so that a coffee treated at 190° C. for 30 sec. was less flavour modified than a coffee treated at 215° C. for 90 sec. (optimum flavour modification). Treatment at this temperature for longer than 120 sec. results in the generation of undesirable flavour notes ("charred"; "tobacco") and also the generation of solid precipitates.

Heat treatment results in green (i.e. unroasted) *Arabica* beans having a reduced pH compared to untreated beans (typically from pH 5.9 to 6.1 in untreated coffee to pH 4.5 to 5.0 for Brazils). Total organic acid content is increased from 0.74 mmol/kg to up to 1.8 mmol/kg for the most extreme heat treatment (range is 1 to 1.8 mmol/kg). The main increases are in the roasting acids (acetic, formic, quinic). Sucrose decreases from around 4.4 g/100 g to around 3 to 3.5 g/100 g.

In the roasted coffee, the pyrazines are reduced by around 83% (indicated by ethyl-pyrazine; 16.4 mg/kg to 2.8 mg/kg), and the guiacols are reduced by around 21% (indicated by vinyl-guiacol; 79.5 mg/kg to 62.9 mg/kg). In contrast, β-damascenone is slightly reduced (from 0.7 mg/kg to 0.5 mg/kg).

Example 3

Green Extract Resin Treatment of *Robusta* Coffee

For flavour modification of *Robusta* coffee, polyvinylpolypyrrolidone (PVPP) resin can be used to remove the compounds coumaryltryptophan (CoT) and caffeoyltryptophan (CaT). These compounds are precursors of 3-methyl indole (skatol), which is a causative agent of the musty note of *Robusta* coffee. Saturated green extract is treated with the resin as a slurry at a ratio of 5% PVPP solids to volume of saturated extract, at room temperature (23° C.). The resin-extract mix is agitated for 20 min, after which it is filtered to remove the spent resin. The resin treatment is repeated twice, after which the clarified extract is reduced in CoT and CaT content by around 80%, from 2.39 to 0.45 g/kg and 0.44 to 0.09 g/kg for CaT and CoT respectively (FIGS. 4 and 5). Green coffee is then treated with the modified extract. On roasting, the coffee produced from the treated beans is reduced in 3-methyl indole content by about 80%. The coffee brews are described as less harsh and without the typical *Robusta* musty note.

Example 4

Green Extract Fermentation of *Robusta* Coffee

Figure 6:
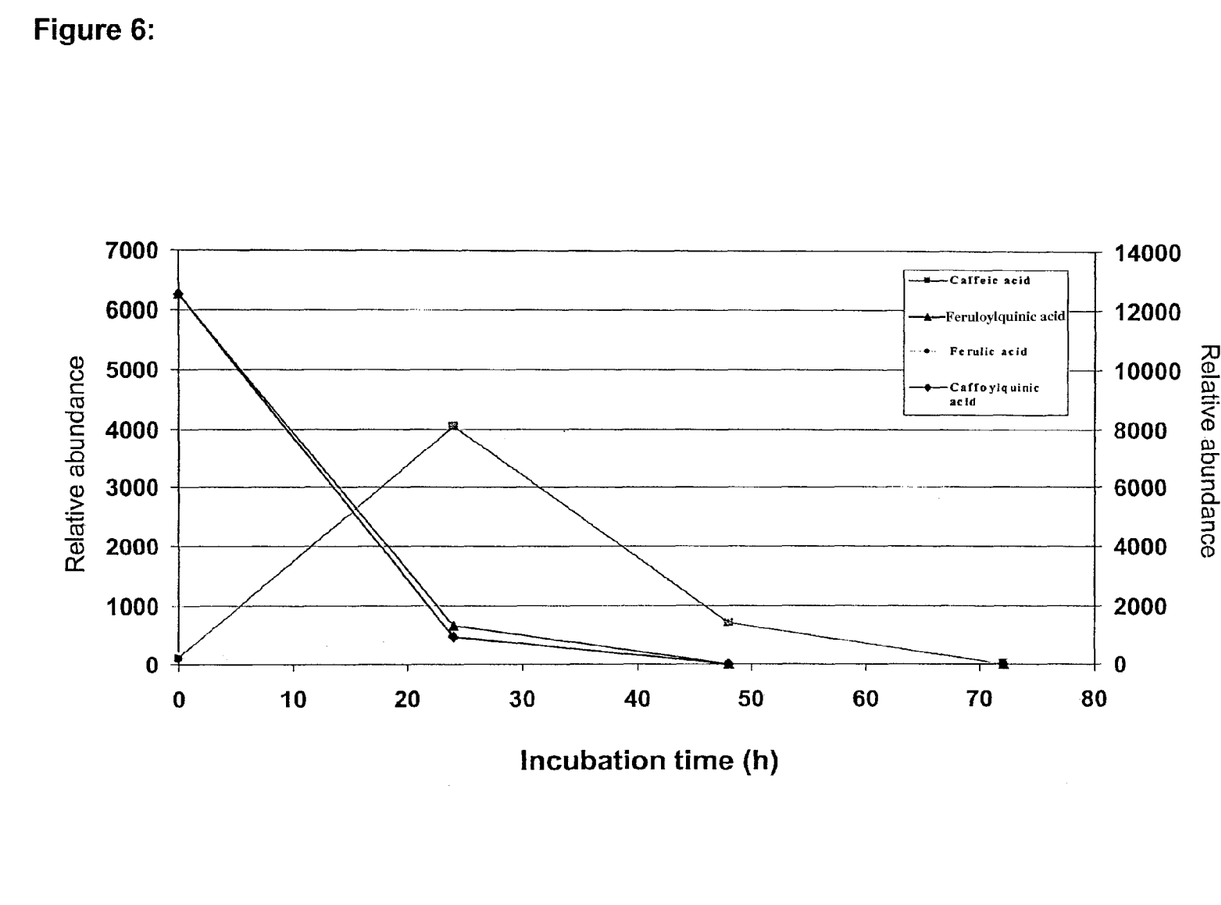
FIG. 6 is a diagram showing the effect of fermentation time on reduction of caffoylquinic acid and feruloylquinic acid in *Robusta* green coffee extract.

Saturated *Robusta* green coffee extract was sterilized by autoclaving prior to starting the fermentation and transferred to a biofermentor. The fermentation medium was cooled to the inoculation temperature of 30° C. and inoculated with the seed culture at a rate of 1%. The inoculum of *Rhodotorula mucilaginosa* (Kraft strain Y8, grown from seed stock on liquid N2) in YM broth (Difco, USA) was used. This strain had been isolated from soil by growth on selective media containing the target compounds (CQA and FQA) as the sole carbon source. The bioreactor was run with a dissolved oxygen (pO2) lower limit of 40%, sparged at 1.0 vvm, and agitated as required to maintain DO setpoint with Amax=600 rpm. The bioprocess was allowed to proceed for 72 h with samples taken at 24 h intervals for HPLC analysis for the target compounds. At 72 h, the fermentation broth was heat treated to inactivate the biomass (85° C./30 min), harvested, and then freeze dried and rehydrated to a solids content of 10.4%. The concentrated extract was then replenished with native sucrose levels exhausted during the bioprocess. Sucrose was added at a rate of 2.78% which was the calculated difference between the native and the extracted dried bean at 10% moisture each. The pH was readjusted from about 7.0 to about 5.8. The extract now contained the appropriate soluble solids at 13.2% and was re-infused to the extracted green coffee beans. Coffee produced from the modified beans was significantly less bitter and possessed a milder taste when compared to brew produced from the native bean and a process control. There was no processed note. FIG. 6 shows removal of the target compounds over the 72 h incubation time. These data show that, after 24 h, nearly all of the target compounds have been removed. Therefore, the incubation could be shortened, and may not need to be longer than 24 h.

Green beans (*Robusta*) produced through the extract fermentation process have reduced caffoylquinic acid of less than about 350 mg/kg, preferably less than about 200 mg/kg, feruloylquinic acid content of less than about 450 mg/kg, preferably less than about 100 mg/kg, and a reduced CaT content of less than about 1.0 g/kg, preferably less than about 0.5 g/kg (reduced by at least 90% after 48 h of extract fermentation) compared to untreated green beans.

On roasting, the guiacol content of the coffee is reduced by around 71% (indicated by vinyl-guiacol; 239.2 mg/kg to 69.3 mg/kg) and pyrazines are reduced by around 85% (indicated by ethyl-pyrazine; 25.4 mg/kg to 3.9 mg/kg), and also a lower β-damascenone content than untreated coffee (0.4 vs. 0.8 mg/kg for treated and untreated coffees respectively). 3-Methyl indole is also reduced by around 13% (from 1.01 mg/kg to 0.9 mg/kg).

The invention claimed is:

1. A method for preparing *Robusta* or *Arabica* quality coffee beans having improved coffee flavor, said method comprising:
   (1) extracting dry or pre-moistened *Robusta* or *Arabica* quality green coffee beans with an aqueous solution at about 60° C. to about 100° C. for about 2 to about 4 hours to obtain (i) an aqueous extract containing water-soluble flavor precursors at about 4 to about 40 weight percent soluble solids, and (ii) extracted wet coffee beans having contacted surface water;
   (2) separating the aqueous extract and the extracted wet coffee beans having contacted surface water;
   (3) treating the separated aqueous extract to modify the water-soluble flavor precursors to obtain modified water-soluble flavor precursors, wherein the modified water-soluble flavor precursors are contained in the treated separated aqueous extract or are soluble solids obtained from the treated separated aqueous extract, wherein the treating is selected from one of heating the separated aqueous extract to hydrolyze water-soluble flavor precursors to organic acids, reducing levels of coumaryltryptophan and caffeoyltryptophan in the separated aqueous extract by contacting the separated aqueous extract with a hydrophobic or cation exchange resin, and treating the separated aqueous extract with a microorganism to reduce levels of caffeoylquinic acid and feruloylquinic acid in the separated extract;
   (4) combining the modified water-soluble flavor precursors with the separated extracted wet coffee beans having contacted surface water before drying to provide flavor-enhanced coffee beans; and
   (5) drying the flavor-enhanced coffee beans to obtain the *Robusta* or *Arabica* quality coffee beans having improved coffee flavor,
   wherein the aqueous solution used in step (1) is treated extract having modified water soluble flavor precursors which are used to extract water soluble flavor precursors from the green coffee beans.

2. The method of claim 1, and wherein the treating in step (3) comprises heating the separated aqueous extract at an elevated temperature and for a time sufficient to reduce the pH of the separated aqueous extract by about 0.2 to about 2 pH units and to form the modified water-soluble precursors.

3. The method of claim 2, wherein the green coffee beans are *Arabica* quality and wherein the elevated temperature is about 170 to about 250° C., the time is about 10 to about 360 sec., and the pH is reduced by about 0.5 to about 2 pH units.

4. The method of claim 2, wherein the green coffee beans are *Arabica* quality and wherein the elevated temperature is about 50 to about 90° C., the time is about 2 to about 60 hours, and the pH is reduced by about 0.5 to about 2 pH units.

5. The method of claim 3, wherein the elevated temperature is about 190 to about 230° C. and the pH is reduced by about 1 to about 2 pH units.

6. The method of claim 2, wherein the green coffee beans are *Robusta* quality and wherein the elevated temperature is about 170 to about 250° C., the time is about 10 to about 360 sec., and the pH is reduced by about 0.2 to about 1.2 pH units.

7. The method of claim 6, wherein the elevated temperature is about 190 to about 230° C. and the pH is reduced by about 0.4 to about 0.9 pH units.

8. The method of claim 2, wherein the aqueous solution used in step (1) includes a portion of the separated aqueous extract which has been treated to modify the water-soluble flavor precursors from step (3) which is recycled to step (1).

9. The method of claim 1, and wherein the treating in step (3) comprises reducing levels of coumaryltryptophan and caffeoyltryptophan in the separated aqueous extract by contacting the separated aqueous extract with about 2 to about 5 weight percent of the hydrophobic or cation exchange resin at about 5 to 60° C. for about 5 to about 30 minutes and then removing the hydrophobic or cation exchange resin to form the modified water-soluble precursors.

10. The method of claim 9, wherein the resin is polyvinylpyrrolidone and wherein the levels of coumaryltryptophan and caffeoyltryptophan in the coffee beans with improved coffee flavor are reduced by at least about 50 weight percent.

11. The method of claim 9, wherein the resin is polyvinylpyrrolidone and wherein the levels of coumaryltryptophan and caffeoyltryptophan in the coffee beans with improved coffee flavor are reduced by at least about 80 weight percent.

12. The method of claim 10, wherein the separated aqueous extract is contacted with the resin in step (3) for 2 to 5 times.

13. The method of claim 1, and wherein the treating in step (3) comprises treating the separated aqueous extract with the microorganism for about 12 to 120 hours to reduce levels of caffoylquinic acid and feruloylquinic acid in the separated aqueous extract and then removing the microorganism to form the modified water-soluble precursors.

14. The method of claim 13, wherein the microorganism is *Rhodotorula mucilaginosa*.

15. The method of claim 13, further comprising a step of adjusting sucrose level, pH value, or both sucrose level and pH value of the modified water-soluble flavor precursors to their corresponding level or value in the separated aqueous extract from step (1), wherein the adjustment is carried out before step (4).

16. The method of claim 14, further comprising a step of adjusting sucrose level, pH value, or both sucrose level and pH value of the modified water-soluble flavor precursors to their corresponding level or value in the separated aqueous extract from step (1), wherein the adjustment is carried out before step (4).

17. The method of claim 15, wherein the levels of caffoylquinic acid and feruloylquinic acid in the separated aqueous extract are each reduced by at least about 95 percent by weight.

18. The method of claim 16, wherein the levels of caffoylquinic acid and feruloylquinic acid in the separated aqueous extract are each reduced by at least about 95 percent by weight.

19. The method of claim 1, wherein pre-moistened *Robusta* or *Arabica* quality green coffee beans having a moisture content of about 50 to 60 weight percent are used in step (1).

20. The method of claim 9, wherein pre-moistened *Robusta* or *Arabica* quality green coffee beans having a moisture content of about 50 to 60 weight percent are used in step (1).

21. The method of claim 13, wherein pre-moistened *Robusta* or *Arabica* quality green coffee beans having a moisture content of about 50 to 60 weight percent are used in step (1).

22. *Robusta* or *Arabica* quality coffee beans having improved coffee flavor, said coffee beans being prepared by a method comprising:
   (1) extracting dry or pre-moistened *Robusta* or *Arabica* quality green coffee beans with an aqueous solution at about 60° C. to about 100° C. for about 2 to about 4 hours to obtain (i) an aqueous extract containing water-soluble flavor precursors at about 4 to about 40 weight percent soluble solids, and (ii) extracted wet coffee beans;
   (2) separating the aqueous extract and the extracted wet coffee beans;
   (3) treating the separated aqueous extract to modify the water-soluble flavor precursors to obtain modified water-soluble flavor precursors, wherein the modified water-soluble flavor precursors are contained in the treated separated aqueous extract or are soluble solids obtained from the treated separated aqueous extract, wherein the treating is selected from one of heating the separated aqueous extract to hydrolyze water-soluble flavor precursors to organic acids, reducing levels of coumaryltryptophan and caffeoyltryptophan in the separated aqueous extract by contacting the separated aqueous extract with a hydrophobic or cation exchange resin, and treating the separated aqueous extract with a microorganism to reduce levels of caffeoylquinic acid and feruloylquinic acid in the separated extract;
   (4) combining the modified water-soluble flavor precursors with the separated extracted wet coffee beans before drying to provide flavor-enhanced coffee beans; and
   (5) drying the flavor-enhanced coffee beans to obtain the *Robusta* or *Arabica* quality coffee beans having improved coffee flavor and wherein the aqueous solution used in step (1) is treated extract having modified water soluble flavor precursors which are used to extract water soluble flavor precursors from the green coffee beans.

23. The *Robusta* or *Arabica* quality coffee beans of claim 22, wherein the *Robusta* or *Arabica* quality coffee beans having improved coffee flavor of step (5) are roasted.

24. The *Robusta* or *Arabica* quality coffee beans of claim 22, wherein the coffee beans are of *Robusta* quality, wherein the coffee beans have a reduced pH of 4.8 to 5.2, a reduced sucrose content of less than about 2.0 g/100 g coffee beans and an increased total acid content of more than about 0.2 mmol/kg coffee beans.

25. The *Robusta* or *Arabica* quality coffee beans of claim 23, wherein the coffee beans are of *Robusta* quality, wherein the roasted coffee beans have a reduced vinyl-guiacol content of less than about 200 mg/kg roasted coffee beans and a reduced ethyl-pyrazine content of less than about 15 mg/kg roasted coffee beans.

26. The *Robusta* or *Arabica* quality coffee beans of claim 22, wherein the coffee green beans are of *Arabica* quality, wherein the coffee beans have a reduced pH of 4.5 to 5.0, a reduced sucrose content of less than about 3.5 g/100 g coffee beans and an increased total acid content of more than about 1.0 mmol/kg coffee beans.

27. The *Robusta* or *Arabica* quality coffee beans of claim 23, wherein the coffee beans are of *Arabica* quality, wherein the roasted coffee beans have a reduced vinyl-guiacol content of less than about 70 mg/kg roasted coffee beans and a reduced ethyl-pyrazine content of less than about 5 mg/kg roasted coffee beans.

28. The *Robusta* or *Arabica* quality coffee beans of claim 22, wherein the coffee beans are of *Robusta* quality, wherein the coffee beans have a reduced coumaryltryptophan content of less than about 0.05 g/kg coffee beans and a reduced caffeoyltryptophan content of less then about 1.0 g/kg coffee beans.

29. The *Robusta* or *Arabica* quality coffee beans of claim 23, wherein the coffee beans are of *Robusta* quality, wherein the roasted beans have a reduced coumaryltryptophan content of less than about 0.05 g/kg roasted coffee beans and a reduced caffeoyltryptophan content of less then about 1.0 g/kg roasted coffee beans, and a reduced 3-methylindol content of less than about 1.0 mg/kg roasted coffee beans.

30. The *Robusta* or *Arabica* quality coffee beans of claim 22, wherein the coffee beans are of *Robusta* quality, wherein the coffee beans have a reduced caffoylquinic acid content of less than about 350 mg/kg coffee beans, a reduced feruloylquinic acid content of less than about 450 mg/kg coffee beans, and a reduced caffeoyltryptophan content of less than about 1.0 g/kg coffee beans.

31. The *Robusta* or *Arabica* quality coffee beans of claim 23, wherein the coffee beans are of *Robusta* quality, wherein the roasted coffee beans have a reduced vinyl-guiacol content of less than about 100 mg/kg roasted coffee beans, and a reduced ethyl-pyrazine content of less than about 10 mg/kg roasted coffee beans.

32. A method for preparing *Robusta* or *Arabica* quality coffee beans having improved coffee flavor, said method comprising:
(1) extracting dry or pre-moistened *Robusta* or *Arabica* quality green coffee beans with an aqueous solution at about 60° C. to about 100° C. for about 2 to about 4 hours to obtain (i) an aqueous extract containing water-soluble flavor precursors at about 4 to about 40 weight percent soluble solids, and (ii) extracted wet coffee beans;
(2) separating the aqueous extract and the extracted wet coffee beans;
(3) treating the separated aqueous extract to modify the water-soluble flavor precursors to obtain modified water-soluble flavor precursors, wherein the modified water-soluble flavor precursors are contained in the treated separated aqueous extract or are soluble solids obtained from the treated separated aqueous extract, wherein the treating is selected from one of heating the separated aqueous extract to hydrolyze water-soluble flavor precursors to organic acids, reducing levels of coumaryltryptophan and caffeoyltryptophan in the separated aqueous extract by contacting the separated aqueous extract with a hydrophobic or cation exchange resin, and treating the separated aqueous extract with a microorganism to reduce levels of caffeoylquinic acid and feruloylquinic acid in the separated extract;
(4) combining the modified water-soluble flavor precursors with the separated extracted wet coffee beans before drying to provide flavor-enhanced coffee beans; and
(5) drying the flavor-enhanced coffee beans to obtain the *Robusta* or *Arabica* quality coffee beans having improved coffee flavor,
wherein the aqueous solution used in step (1) comprises previously treated extract from step (3) which is recycled to step (1) whereby the previously treated extract replaces one or more constituents in the dry or pre-moistened *Robusta* or *Arabica* quality green coffee beans.

* * * * *

UNITED STATES PATENT AND TRADEMARK OFFICE
CERTIFICATE OF CORRECTION

PATENT NO. : 8,658,231 B2
APPLICATION NO. : 11/771529
DATED : February 25, 2014
INVENTOR(S) : Simon Peter Penson et al.

It is certified that error appears in the above-identified patent and that said Letters Patent is hereby corrected as shown below:

In the Claims

Column 13, line 40, in claim 13, delete "caffoylquinic" and insert --caffeoylquinic-- therefor.

Column 13, lines 57 58, in claim 17, delete "caffoylquinic" and insert --caffeoylquinic-- therefor.

Column 13, lines 61 62, in claim 18, delete "caffoylquinic" and insert --caffeoylquinic-- therefor.

Column 14, line 55, in claim 25, delete "vinyl guiacol" and insert --vinyl guaiacol-- therefor.

Column 14, line 67, in claim 27, delete "vinyl guiacol" and insert --vinyl guaiacol-- therefor.

Column 15, line 8, in claim 28, delete "less then" and insert --less than-- therefor.

Column 15, line 14, in claim 29, delete "less then" and insert --less than-- therefor.

Column 15, line 19, in claim 30, delete "caffoylquinic" and insert --caffeoylquinic-- therefor.

Column 15, line 26, in claim 31, delete "vinyl guiacol" and insert --vinyl guaiacol-- therefor.

Signed and Sealed this
First Day of July, 2014

Michelle K. Lee
*Deputy Director of the United States Patent and Trademark Office*